United States Patent
Suba (10) Patent No.: US 7,865,702 B2
(45) Date of Patent: Jan. 4, 2011

(54) STALL PREDICTION THREAD MANAGEMENT

(75) Inventor: Victor Suba, Foster City, CA (US)

(73) Assignee: Sony Computer Entertainment Inc., Tokyo (JP)

(*) Notice: Subject to any disclaimer, the term of this patent is extended or adjusted under 35 U.S.C. 154(b) by 0 days.

(21) Appl. No.: 12/542,157

(22) Filed: Aug. 17, 2009

(65) Prior Publication Data

US 2010/0017582 A1    Jan. 21, 2010

Related U.S. Application Data

(63) Continuation of application No. 11/700,448, filed on Jan. 30, 2007, now Pat. No. 7,577,826.

(60) Provisional application No. 60/797,762, filed on May 3, 2006, provisional application No. 60/763,568, filed on Jan. 30, 2006.

(51) Int. Cl.
    *G06F 9/48* (2006.01)
(52) U.S. Cl. ................. 712/220; 712/219
(58) Field of Classification Search ............ None
    See application file for complete search history.

(56) References Cited

U.S. PATENT DOCUMENTS

| | | | |
|---|---|---|---|
| 6,016,542 A | 1/2000 | Gottlieb et al. | |
| 6,272,520 B1* | 8/2001 | Sharangpani et al. | 718/108 |
| 7,181,601 B2* | 2/2007 | Rudd et al. | 712/239 |
| 7,213,134 B2* | 5/2007 | Soltis et al. | 712/229 |
| 7,281,250 B2* | 10/2007 | Ohsawa et al. | 718/102 |
| 7,458,065 B2* | 11/2008 | Sanchez et al. | 717/131 |
| 7,664,936 B2* | 2/2010 | Jensen et al. | 712/214 |
| 2005/0149697 A1 | 7/2005 | Enright et al. | |

OTHER PUBLICATIONS

Eichenberger, A.E. et al., "Optimizing Compiler for a CELL Processor," 2005, *IEEE*, 12 pages.
Mcnairy, C. et al., "Montecito: A Dual-Core, Dual Thread Itanium Processor," 2005, *IEEE*, pp. 10-20.

* cited by examiner

*Primary Examiner*—Eric Coleman
(74) *Attorney, Agent, or Firm*—Townsend and Townsend and Crew LLP (57) ABSTRACT

Thread switching prevents pipeline stalls when executing multiple threads. An analysis of a first thread identifies instructions capable of causing pipeline stalls. If pipeline stalls from the identified instructions are likely, thread switching instructions are added to the first thread in place of the identified instructions. Thread switching instructions direct a microprocessor to suspend executing the thread and begin executing a second thread. Thread switching instructions can be added to the second thread to enable the resumption of the first thread at the location specified by the identified instruction. The thread switching instructions are configured to avoid pipeline stalls when switching threads. Thread switching instructions can store and retrieve thread-specific information upon the suspension and resumption of threads. Thread switching instructions can schedule the execution of two or more threads in accordance with load balancing schemes. Threads can be modified using static or dynamic code analysis and modification techniques.

20 Claims, 8 Drawing Sheets

STALL PREDICTION THREAD MANAGEMENT

CROSS-REFERENCES TO RELATED APPLICATIONS

This application is a continuation application of U.S. patent application Ser. No. 11/700,448, filed Jan. 30, 2007 (to be issued on Aug. 18, 2009 as U.S. Pat. No. 7,577,826), which is an application claiming benefit under 35 USC 119(e)(1) of U.S. Provisional Patent Application No. 60/797,762, filed May 3, 2006, entitled "Stall Prediction Thread Management," and U.S. Provisional Patent Application No. 60/763,568, filed Jan. 30, 2006, entitled "Branch Prediction Thread Management." This application is also related to U.S. Provisional Patent Application No. 60/763,568, filed Jan. 30, 2006, entitled "Branch Prediction Thread Management;" U.S. Provisional Patent Application No. 60/797,435, filed May 3, 2006, entitled "DMA and Graphics Interface Emulation;" U.S. Provisional Patent Application No. 60/797,761, filed May 3, 2006, entitled "Code Translation and Pipeline Optimization;" U.S. Provisional Patent Application No. 60/746,267, filed May 3, 2006, entitled "Translation Block Invalidation Prehints in Emulation of a Target System on a Host System;" U.S. Provisional Application No. 60/746,268, filed May 3, 2006, entitled "Register Mapping in Emulation of a Target System on a Host System;" and U.S. Provisional Patent Application No. 60/746,273, filed May 3, 2006, entitled "Method and Apparatus for Resolving Clock Management Issue in Emulation Involving Both Interpreted and Translated Code," all of which are incorporated by reference herein for all purposes.

BACKGROUND OF THE INVENTION

The invention relates the field of computer science and specifically to the optimization of multithreaded applications for pipelined microprocessors. Microprocessors typically perform a number of different tasks to execute an instruction. Typically, the tasks for each microprocessor instruction must be performed in sequence. For example, a microprocessor must first read or fetch an instruction; interpret or decode the instruction; read or fetch the data needed to perform the instruction, if any; execute the instruction; and store the instruction results, if any.

Many microprocessor use an instruction pipeline to improve performance. In an instruction pipeline, each task for executing an instruction is performed by a different portion of the microprocessor hardware, referred to as a pipeline stage. The pipeline stages are connected in the sequence that the microprocessor performs tasks to execute instructions.

Pipeline stages are typically capable of operating relatively independently. As a result, earlier pipeline stages, which are the pipeline stages at the beginning of the pipeline, can start work on subsequent instructions while the later pipeline stages are still performing task for earlier instructions. Microprocessors including instruction pipelines with 20 or 30 are not uncommon. Specialized information processing devices, such digital signal processors, graphics processing units, and ASICs can include much longer instruction pipelines.

Ideally, every pipeline stage is constantly active and processing instructions, rather than idle. If a pipeline stage must wait for an instruction or data, the pipeline is said to have stalled. Frequent pipeline stalls decrease the performance of pipelined microprocessors.

Threads of execution, or threads, are a common technique for splitting programs into two or more simultaneous running tasks. Multiple threads can often be executed in parallel, either by multiple microprocessors operating in parallel; a single microprocessor with multiple execution cores or specialized multithreaded execution capabilities; or by time-multiplexing different threads, where a processor frequently switches execution between different threads.

Compilers, operating systems, and virtual machines can include additional instructions within the object code of a program to implement multiple threads. These additional instructions can handle features such as starting and stopping threads, switching between threads, preserving thread state information, thread scheduling and priority, and inter-thread communication. These features can be implemented using specialized features of the microprocessor or with general microprocessor features, such as timers, interrupts, and stack operations, and programming conventions.

Typically, threads are executed on a time sharing basis. Thread switching is performed at predetermined time intervals based on thread priority and/or load balancing concerns.

It is desirable for a system and method to provide improved thread switching capabilities while minimizing the frequency and impact of pipeline stalls.

BRIEF SUMMARY OF THE INVENTION

An embodiment of the invention uses thread switching to prevent pipeline stalls when executing multiple threads. A first thread is analyzed to identify at least one instruction capable of causing a pipeline stall. For each identified instruction, a determination is made as to whether a pipeline stall is likely. If so, the first thread is modified to include thread switching instructions in place of the identified instructions. The thread switching instruction directs a microprocessor to suspend executing the thread and begin executing a second thread. Additional thread switching instructions can be added to the second thread to enable the resumption of the execution of the first thread at the appropriate location, as specified by the identified instruction. The thread switching instructions in the first and second threads can be configured to avoid pipeline stalls when switching between thread, for example by including prehint instructions. Thread switching instructions can be used to store and retrieve thread-specific information upon the suspension and resumption of threads. Thread switching instructions can also be used to schedule the execution of two or more threads in accordance with load balancing schemes. Threads can be modified with thread switching instruction using static or dynamic code analysis and modification techniques.

BRIEF DESCRIPTION OF THE DRAWINGS

The invention will be described with reference to the drawings, in which.

DETAILED DESCRIPTION OF THE INVENTION

An embodiment of the invention uses thread switching behavior to prevent pipeline stalls. Many different types of instructions can cause pipeline stalls in a microprocessor. One common source of pipeline stalls is the use of conditional branch instructions. A conditional branch instruction specifies two or more alternate paths for the program execution flow in response to the result of a specified condition. One of the first pipeline stages fetches the next instruction to be executed by microprocessor. Because the location of the next instruction following a conditional branch instruction is often unknown until just before or as the conditional branch instruction itself is executed, earlier pipeline stages must wait idle until the conditional branch instruction is complete. As a result, the instruction pipeline stalls following the conditional branch instruction until the location of the next instruction is determined and the next instruction is fetched.

Branch prediction and prehints can be used to reduce the frequency of pipeline stalls following conditional branch instructions. Branch prediction predicts the next instruction location following a conditional branch instruction. Rather than waiting idle until the next instruction is known for certain, the instruction pipeline will begin speculatively fetching and/or processing instructions following a conditional branch instruction according to the branch prediction. If the branch prediction is correct, then there will be no pipeline stall following a conditional branch instruction. If the branch prediction is incorrect, then the speculatively processed instructions will be discarded and the instruction pipeline will be restarted at the correct instruction following the conditional branch.

Prehints are instructions or attributes of other instructions used to specify branch predictions and other information. Prehints can be used before conditional and unconditional branches as well as other instructions to tell the microprocessor in advance where to fetch instructions. Using information from prehints, the microprocessor can fetch instructions after the branch in advance and avoid a pipeline stall. Because of the length of instruction pipelines, microprocessors must often receive prehints of upcoming predicted branches many instructions ahead of a conditional branch instruction. This time period is referred to herein as the branch lead time. The branch lead time can be expressed in terms of time, processor cycles, or the number of instructions prior to a conditional branch.

Figure 1A:
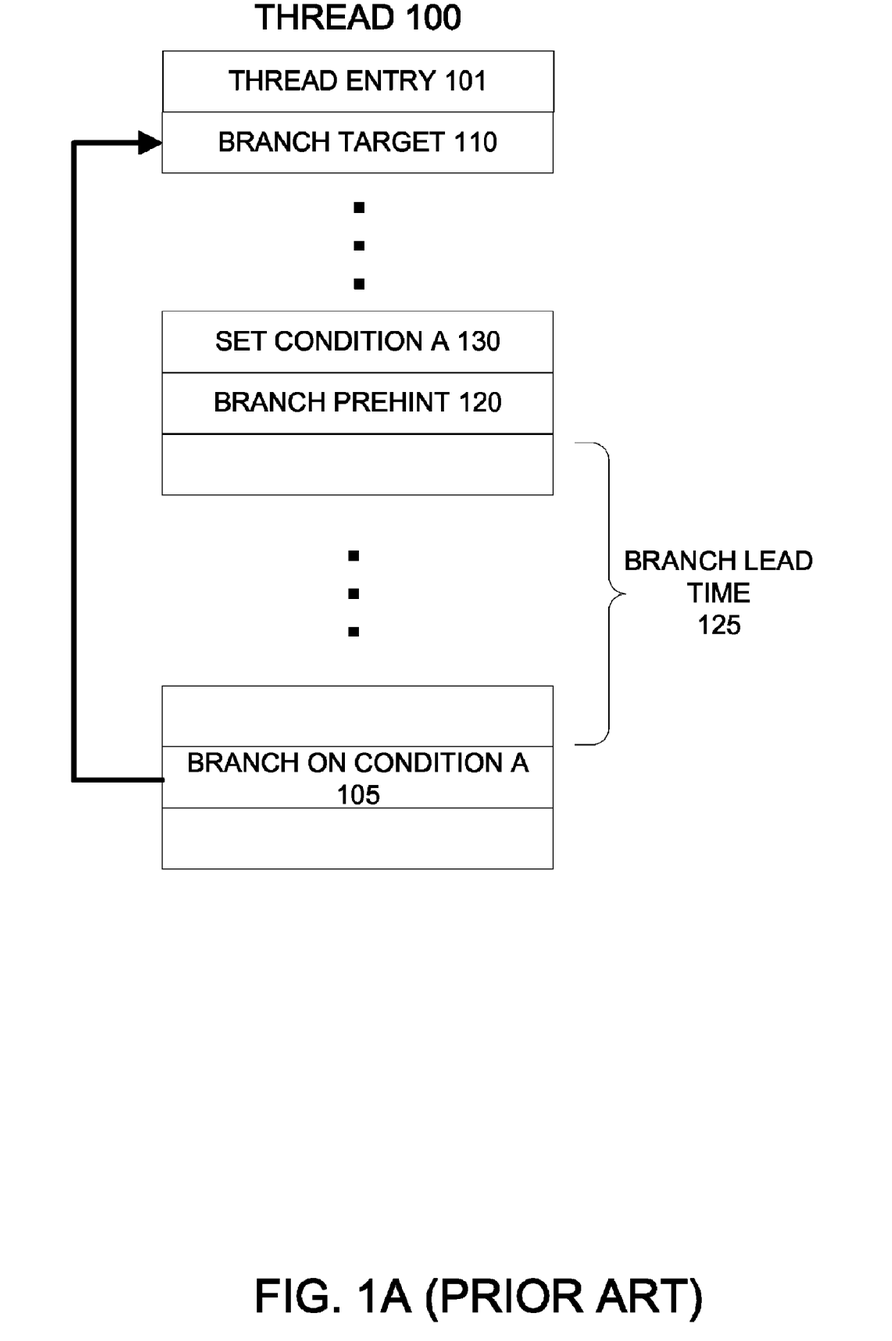
FIGS. 1A-1B illustrate typical prior art threads and their associated problems.
Figure 1B:
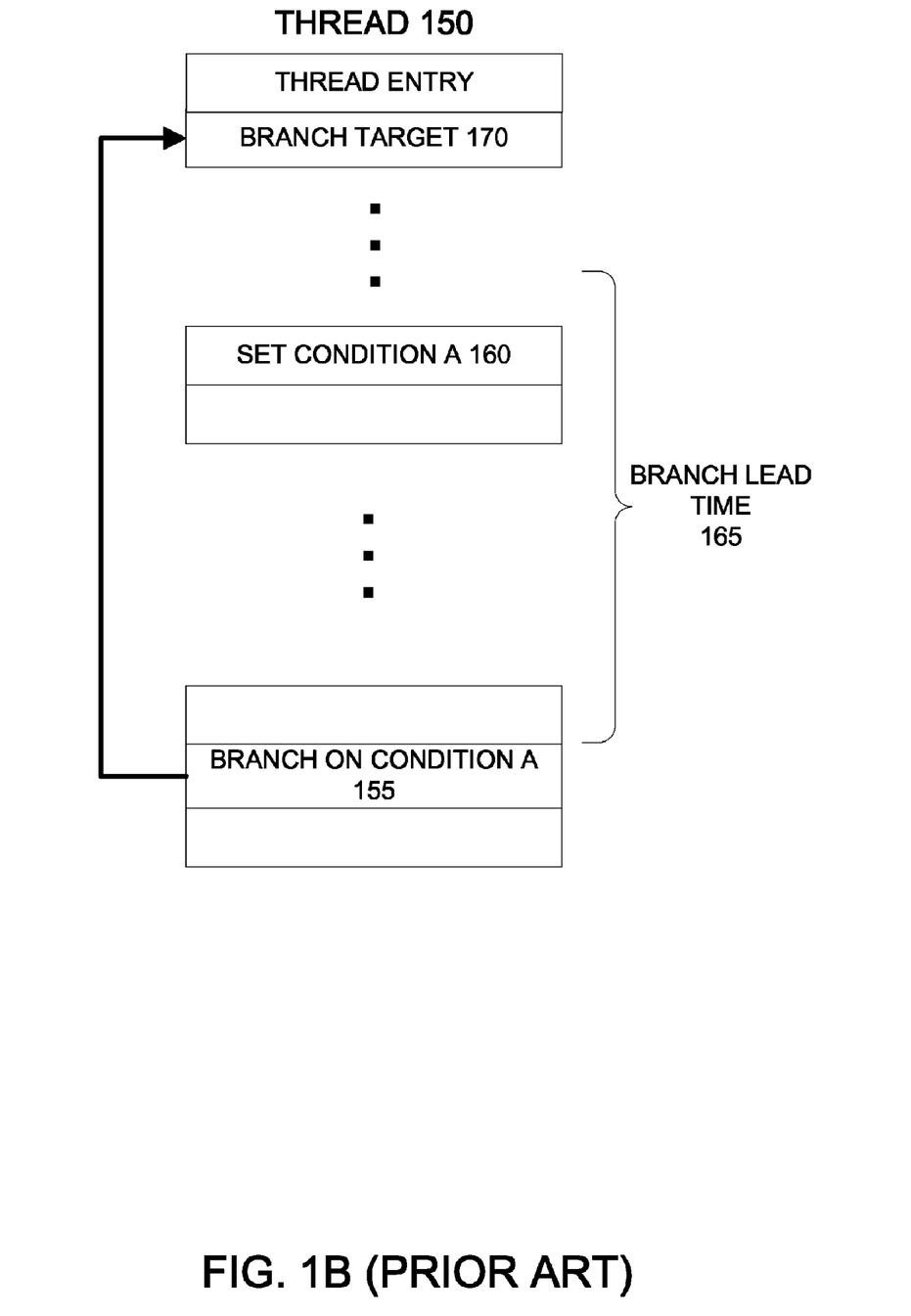

FIGS. 1A and 1B illustrate example applications of branch prehints. FIG. 1A illustrates a thread 100 including a set of instructions for the microprocessor. For purposes of illustration, the instructions in thread 100 and similar illustrations proceeds from top to bottom by default. For example, the execution of thread 100 starts at the instruction at thread entry point 101 and proceeds to execute instructions from top to bottom in sequence.

Branch instructions can alter the execution flow of threads. Thread 100 includes a conditional branch instruction 105. In this example, conditional branch instruction 105 changes the execution flow of the thread 100 based on the value of condition A. In this example, if condition A is satisfied, the execution of thread 100 proceeds to branch target instruction 110 immediately after executing conditional branch instruction 105. Conversely, if condition A is not satisfied, then the execution of thread 100 proceeds to instruction 115 immediately after executing conditional branch instruction 105. The behavior of conditional branch instruction 105 is provided for the purposes of illustration; many different types of branch instructions and branching behavior are well known in the art and are equally adaptable for use with embodiments of the invention.

To alleviate pipeline stalls, a branch prehint instruction 120 can be added to thread 100. The branch prehint instruction 120 indicates the predicted destination of branch instruction 105. The branch prediction instruction 120 must be added in advance of the branch lead time 125 to provide the microprocessor with adequate time to fetch the appropriate instruction following the branch 105 and avert a pipeline stall. The branch prehint instruction 120 can be based on a prediction of the value of the branch condition (e.g. condition A) or on the actual value of the branch condition, if known in advance of the branch lead time 125. Compilers, interpreters, assemblers, virtual machines, libraries, and operating system components can analyze programs and add branch prehint instructions automatically or with the assistance of a programmer. Prehint instructions can be added at the time of compilation or creation of the program or dynamically at run-time through the use of just-in-time compilers, dynamic code generation and modification, and/or self-modifying code.

In this example, an instruction 130 sets the value of condition A prior to the branch lead time 125. Thus, branch prehint instruction 120 can be based on the known value of condition A and branch instruction 105 will never cause a pipeline stall. When the value of condition A is known to cause the execution of the thread 100 to proceed to branch target instruction 110, the microprocessor will fetch branch target instruction 110 (as well as subsequent instructions) prior to the execution of branch instruction 105. As a result, branch instruction 105 will not cause a pipeline stall.

FIG. 1B illustrates an example thread 150. Example thread 150 is similar to example thread 100. Example thread 150 includes a conditional branch instruction 155 responsive to condition A. The value of condition A is set by instruction 160. In thread 150, instruction 160 is executed within the branch lead time 165 for branch instruction 155. As a result, there is not enough time between instruction 160, which sets the value of condition A, and branch instruction 155, which depends on the value of condition A, to fetch the instructions following branch instruction 155. For example, when the value of condition A will cause the execution of the thread 150 to proceed to branch target instruction 170 after branch instruction 155, the microprocessor will not have enough time to fetch branch target instruction 170 and its subsequent instructions. As a result, a pipeline stall will occur.

An embodiment of the invention switches threads of execution in place of high latency instructions, such as conditional branch instructions, potentially causing pipeline stalls. High latency instructions include instructions that require a large number of processor cycles to complete, such as some floating point operations in the x86 processor architectures. High latency instructions may include specific combinations of instructions are known to cause cache misses and pipeline stalls in a processor architecture. For example, storing a value to memory and then immediately reading it from memory can cause a pipeline stall in the PowerPC processor architecture. In a further embodiment, branch prediction prehints in a first thread are used to specify the thread entry point or other starting location in next thread of execution. Because this "prediction" is always correct, pipeline stalls are avoided.

Figure 2A:
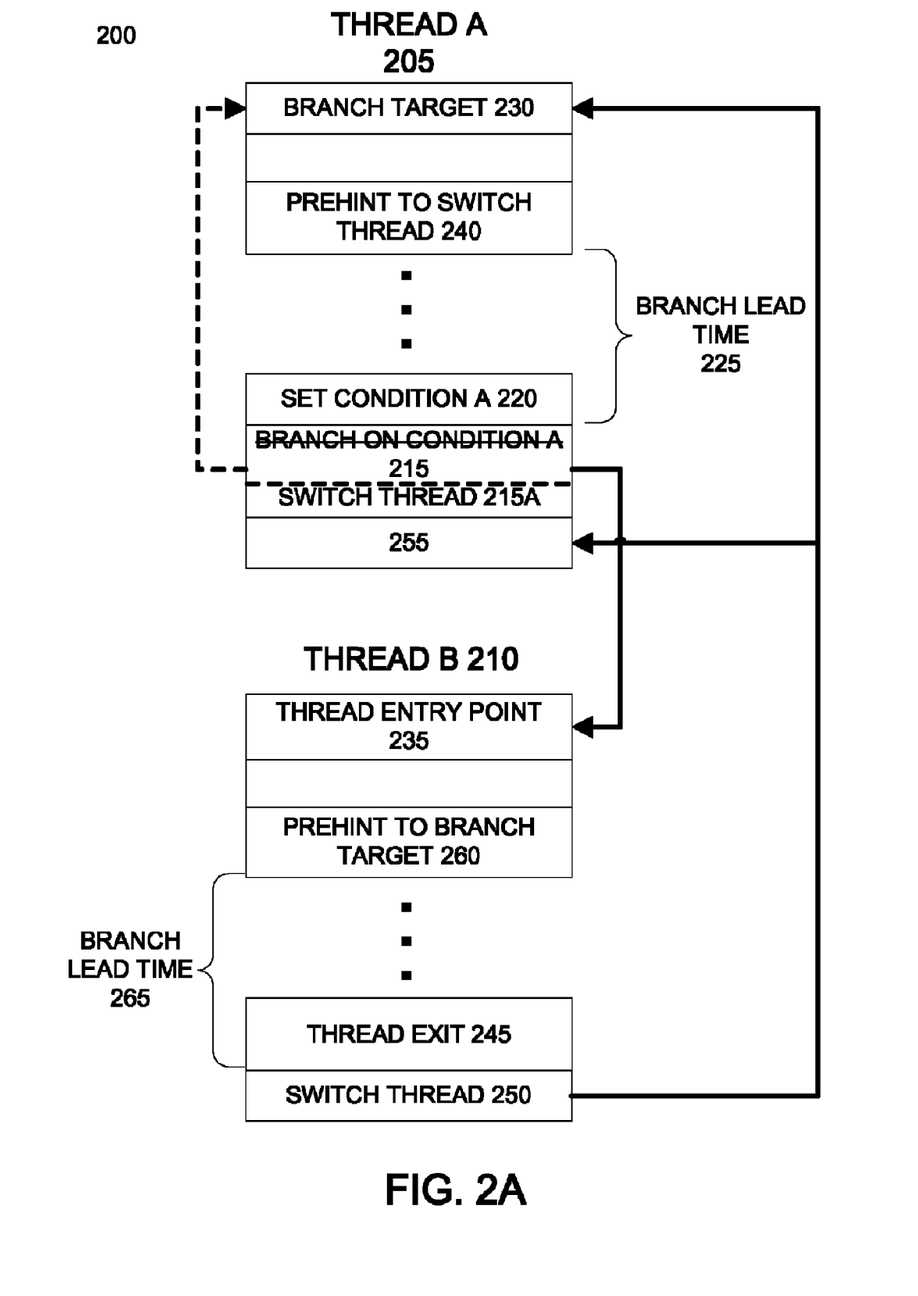
FIGS. 2A-2B illustrates example threads adapted to avoid pipeline stalls according to embodiments of the invention.

FIG. 2A illustrates an example 200 of an embodiment of the invention. Example 200 includes two threads: thread A 205, and thread B 210. Threads A 205 and B 210 are to be executed in a time multiplexed manner on a microprocessor. In this example, thread A 205 is a modified version of thread 150, discussed above. In its original form, thread A 205 includes a conditional branch instruction 215. Conditional branch instruction can redirect the execution of thread A back to branch target instruction 230 in response to the value of condition A. In example 200, the value of condition A is set by instruction 220, which is executed within the branch lead time 225. Because instruction 220 sets the value of condition A within the branch lead time 225, rather than before the branch lead time 225, the microprocessor may have a pipeline stall every time the branch instruction 215 redirects execution back to the branch target instruction 230.

To prevent pipeline stalls, an embodiment of the invention modifies threads A 205 and thread B 210. Thread A 205 is modified so that conditional branch instruction 215 is replaced with a thread switching instruction 215a. Thread switching instruction 215a directs the microprocessor to begin executing thread B 210 beginning at thread entry point 235. To prevent a pipeline stall from occurring when changing threads, a prehint instruction 240 is also added to thread A 205 before the branch lead time 225. Because the destination of the thread switching instruction 215a is known in advance, the "prediction" of the added prehint instruction 240 will always be correct. Therefore, a pipeline stall will never occur when switching from thread A 205 to thread B 210 in this manner.

In an embodiment, the thread switching instruction 215a can be a specific microprocessor adapted to change threads of execution. In another embodiment, the thread switching instruction 215a can be a general-purpose branch instruction set to the thread entry point 235.

In further embodiments, the thread switching instruction 215a can store thread-specific information of thread A 205 for later retrieval when thread A 205 later resumes execution. Thread switching instruction 215a can also retrieve thread-specific information of thread B 210 previously stored. Thread-specific information can be stored in a stack or any other type of memory structure. Thread-specific information can include the state of the microprocessor, such as the contents of condition code registers and other state registers, as well as register contents that may be potentially overwritten by another thread.

In yet a further embodiment, programming conventions, such as restricting the registers available to each thread, can reduce or eliminate the need to store thread-specific data when changing threads. For example, if a processor has 128 general purpose registers, a programming convention can assign 64 registers to each of two threads to be executed. Different programming conventions can be used to assign registers to threads if there are more than two threads to be executed or if one thread requires more registers than the others. Thread switching instruction 215a may be implemented as one or more instructions in thread A 205 and optionally in thread B 210 to accomplish these tasks.

Following thread switching instruction 215a, the microprocessor begins to execute thread B 210 starting at thread entry point 235. The microprocessor will execute the instructions of thread B 210 until it reaches the instruction at thread exit point 245. In an embodiment, the instruction at thread exit point 245 is the last instruction of thread B 210. In another embodiment, the instruction at thread exit point 245 is a conditional branch or other high latency instruction capable of causing a pipeline stall. In still another embodiment, the instruction at thread exit point 245 can be any arbitrary instruction of thread B 210 where a thread change is desired. For example, the thread exit point 245 can be set at an arbitrary instruction of thread B to achieve a desired load-balancing between threads A 205, B 210, and any other threads executed by the microprocessor.

An embodiment adds thread switching instruction 250 to thread B 210. Thread switching instruction 250 directs the microprocessor to resume executing thread A 205. Thus, following thread switching instruction 250, thread A 205 will resume execution at either branch target 230 or instruction 255, depending upon the value of condition A previously set by instruction 220.

To avoid a pipeline stall when resuming execution of thread A 205, an embodiment of the invention adds a prehint instruction 260 to thread B 210. Prehint instruction 260 is added prior to the branch lead time 265 associated with thread switching instruction 250. Prehint instruction 260 is based on the value of condition A, which is previously set by instruction 220. Thus, by the time execution of thread B 210 begins, the value of condition A needed to construct prehint instruction 260 and determine the destination of thread switching instruction 250 is already known. Additional instructions and/or programming conventions can be used to ensure that the results of condition A set by instruction 220 in thread A 205 are available to a prehint instruction in thread B 210, such as storing the value of condition A in a register, stack, or other memory available to the second thread.

An embodiment dynamically modifies thread B 210 to include appropriately configured thread switching instruction 250 and prehint instruction 260 at the time execution of thread B 210 begins. For example, additional instructions executed in conjunction with thread switching instruction 215a can add and/or configure thread switching instruction 250 and prehint instruction 260 to thread B 210. Alternatively, thread switching instruction 215a can store information used by thread switching instruction 250 and prehint instruction 260 to return to the appropriate location in thread A 205. For example, thread switching instruction 215a can store the appropriate return location for thread A 205 in a register. Thread switching instruction 250 and prehint instruction 260 can be configured to access the location in the register.

In an embodiment, the thread switching instructions 215a and 250 and prehint instructions 240 and 260 are added at the time of compilation of the thread code. Additional code instructions associated with thread switching instruction 215a are used to appropriately configure prehint instruction 260 and thread switching instruction 250 based upon the value of condition A set by instruction 220.

Following thread switching instruction 250, thread A 205 will resume execution at either branch target 230 or instruction 255, depending upon the value of condition A previously set by instruction 220. In an embodiment, thread-switching instruction 250 may be similar to thread switching instruction 215a and may be adapted to store thread-specific information of thread B 210 and retrieve and/or restore thread-specific information of thread A 205 prior to the resumption of execution of thread A 205.

Figure 2B:
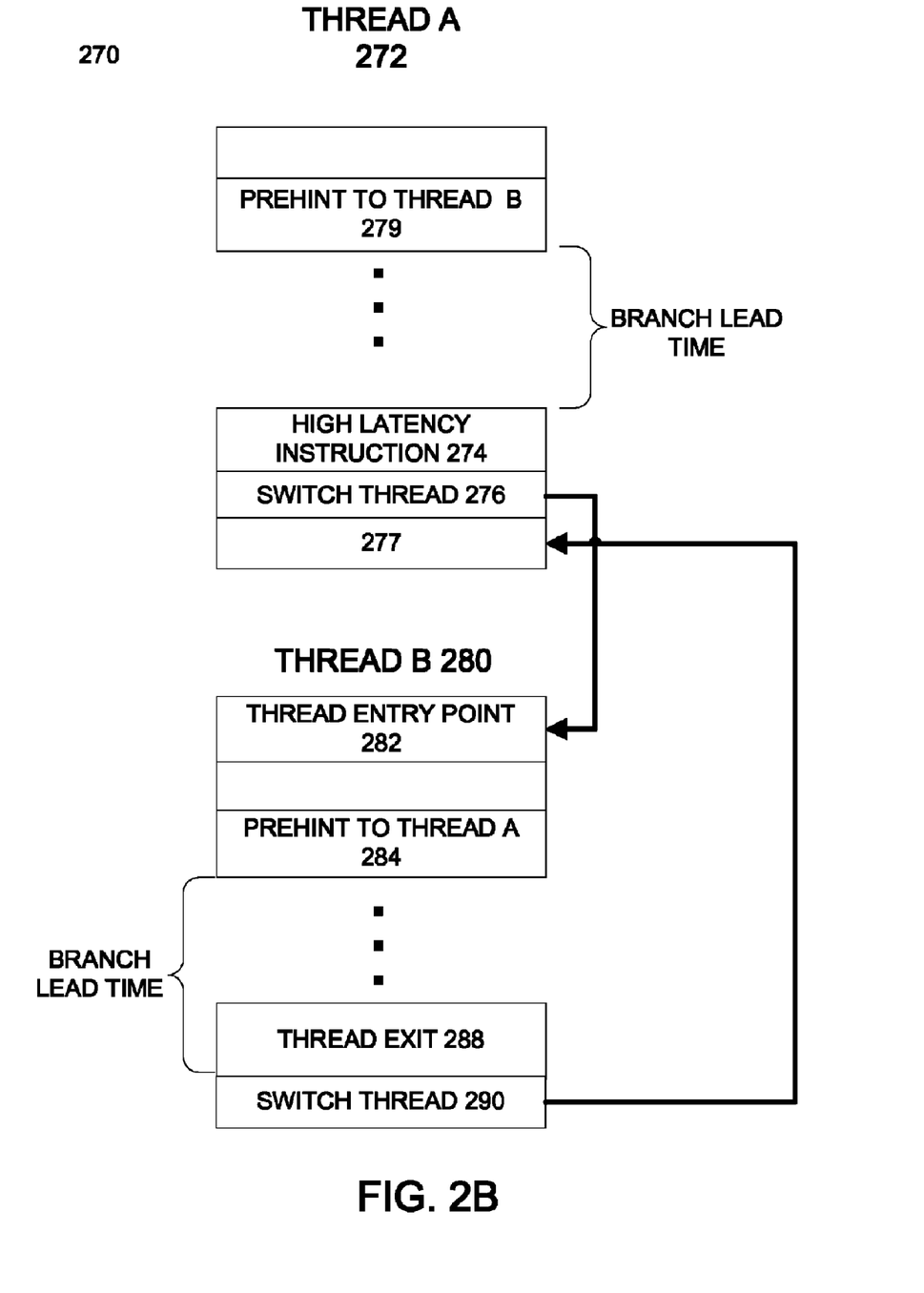

FIG. 2B illustrates another an example 270 of an embodiment of the invention. In this example, thread A 272 includes a high latency instruction 274, such as a floating point operation, that can potentially cause a pipeline stall while waiting for the results of the instruction. Unlike example 200, which replaces a conditional branch instruction with a thread switching instruction, example 270 adds a thread switching instruction 276 after the high latency instruction 274. In addition to the thread switching instruction 276, a prehint instruction 279 is added to thread A 272 to insure that switching threads does not cause a pipeline stall.

During the execution of thread A 272, the processor will begin executing high latency instruction 274. It is assumed that the processor is designed to execute additional instructions following high latency instruction 274 provided these additional instructions do not require the results of the high latency instruction 274. Thus, after initiating the execution of high latency instruction 274, the processor will be able to execute thread switching instruction 276 and thread B 280 while waiting for the results of the high latency instruction 274.

Following thread switching instruction 276, the processor begins executing thread B 280, in this example starting at thread entry point 282. In example 270, thread switching instruction 290 is added to thread B 280 following the last instruction 288. A prehint instruction 284 is also added to thread B 280 to prevent a pipeline stall when returning to thread A 272. Thread switching instruction 290 directs the processor to resume executing thread A 272 at instruction 277 following the high latency instruction 274. By this time, the result of high latency instruction 274 is ready for use in thread A 272, or at the least, the time needed to wait for this result has been hidden by the execution of thread B 280.

Figure 3:
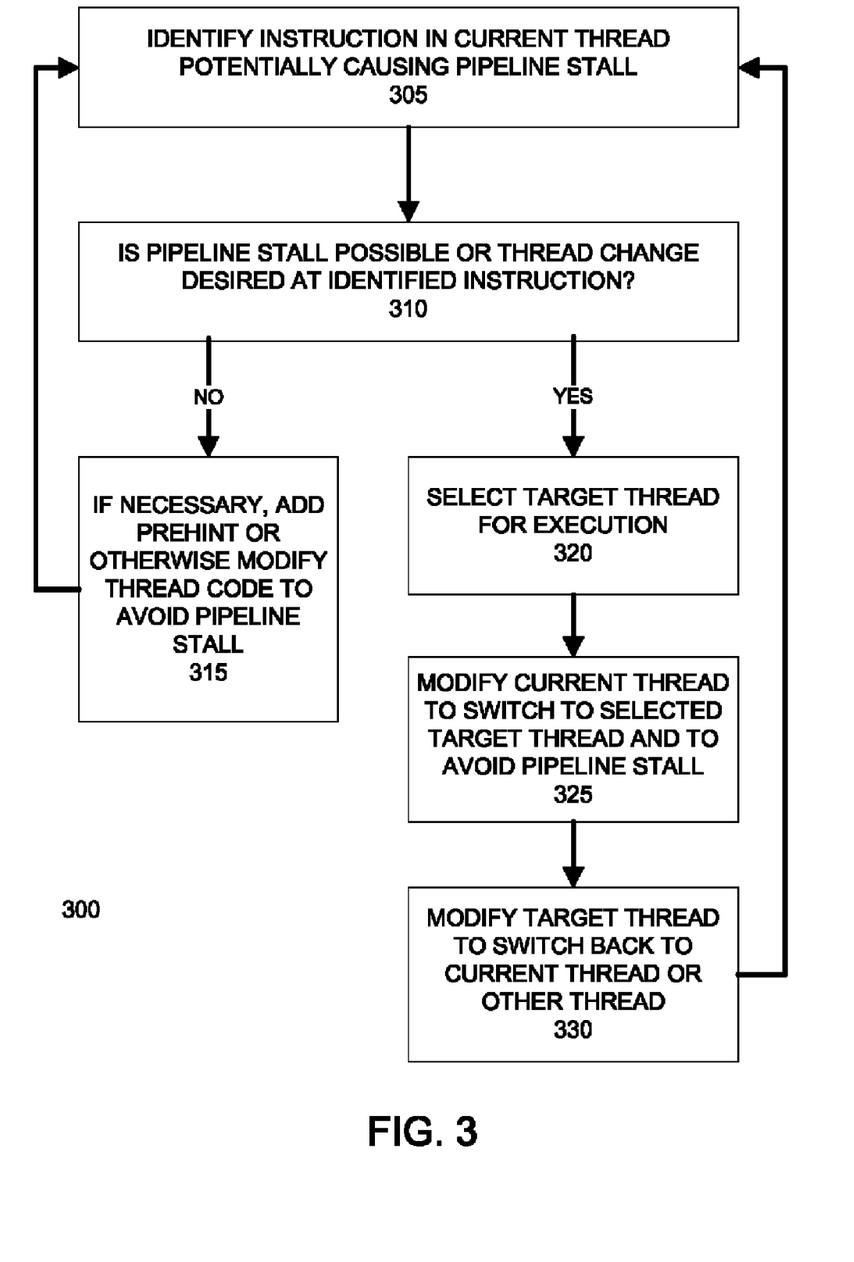
FIG. 3 illustrates a method of analyzing threads according to an embodiment of the invention.

FIG. 3 illustrates a method 300 of analyzing threads according to an embodiment of the invention. Step 305 analyzes a thread of one or more programs under consideration to identify an instruction potentially causing a pipeline stall. Instructions potentially causing a pipeline stall include conditional branch instructions and other high latency instructions, such as floating point operations and architecture specific combinations of instructions known to potentially cause pipeline stalls.

Step 310 evaluates whether a pipeline stall will occur from the identified instruction or if a thread change is desired otherwise. For example, a pipeline stall may arise from a conditional branch instruction if the value of the condition used by this branch instruction is determined within, rather than before, its branch lead time. Even if the value of the condition can be determined before the branch instruction's branch lead time, the method 300 may desire to switch threads anyways, for example, to perform load balancing between two or more threads.

If a pipeline stall will not arise from the identified instruction and there is no need to switch threads at the identified instruction, then method 300 proceeds to step 315. An embodiment of step 315 may modify the thread if necessary to prevent a pipeline stall. For example, an embodiment of step 315 may add a prehint instruction to the thread based on the value of the condition used by an identified conditional branch instruction.

Following step 315, method 300 returns to step 305 to identify other instructions potentially causing pipeline stalls in the same thread or any other thread. If all of the threads of one or more programs under consideration have been fully evaluated, method 300 terminates.

Returning to step 310, if a pipeline stall may arise from the identified instruction and/or there is a need to switch threads at the identified instruction, then method 300 proceeds to step 320. Step 320 selects a new thread, referred to as a target thread, to be executed. The target thread can be selected from a set of threads under consideration using any load-balancing, time-multiplexing, or other resource sharing technique known in the art. For example, threads can be executed sequentially or randomly from a queue or executed according to a thread priority scheme.

Step 325 modifies the current thread to switch to the selected target thread. In an embodiment, the instruction identified in step 305 is replaced with one or more thread switching instructions. Additionally, a prehint instruction may be added to the current thread to prevent a pipeline stall when switching to the target thread. As discussed above, the thread switching instructions can optionally include instructions for storing thread-specific information of the current thread and retrieving thread-specific information of the target thread.

Step 330 modifies the target thread or any other thread to switch back to the current thread. As discussed above, these modifications can include additionally thread switching instructions, prehint instructions, and thread-specific information storage and retrieval instructions. Additional instructions and/or programming conventions can be used to ensure that the value of the condition associated with the identified instruction is taken into account when execution resumes for the current thread. These additional instructions and/or programming conventions can utilize static or dynamically generated code.

Following step 330, method 300 returns to step 305 to identify other instructions potentially causing pipeline stalls in the same thread or any other thread. If all of the threads of one or more programs under consideration have been fully evaluated, method 300 terminates.

In an embodiment, a thread analyzer, which may be included in one or more of a compiler, linker, assembler, optimizing modules, interpreter, emulator, virtual machine, just-in-time compiler, code translators, software libraries, operating system components, and/or runtime modules, performs all or parts of method 300. In various embodiments, method 300 can be performed statically prior to run-time, dynamically at run-time, or using a combination of both static and dynamic thread code analysis, code generation, and/or code modification.

Figure 4:
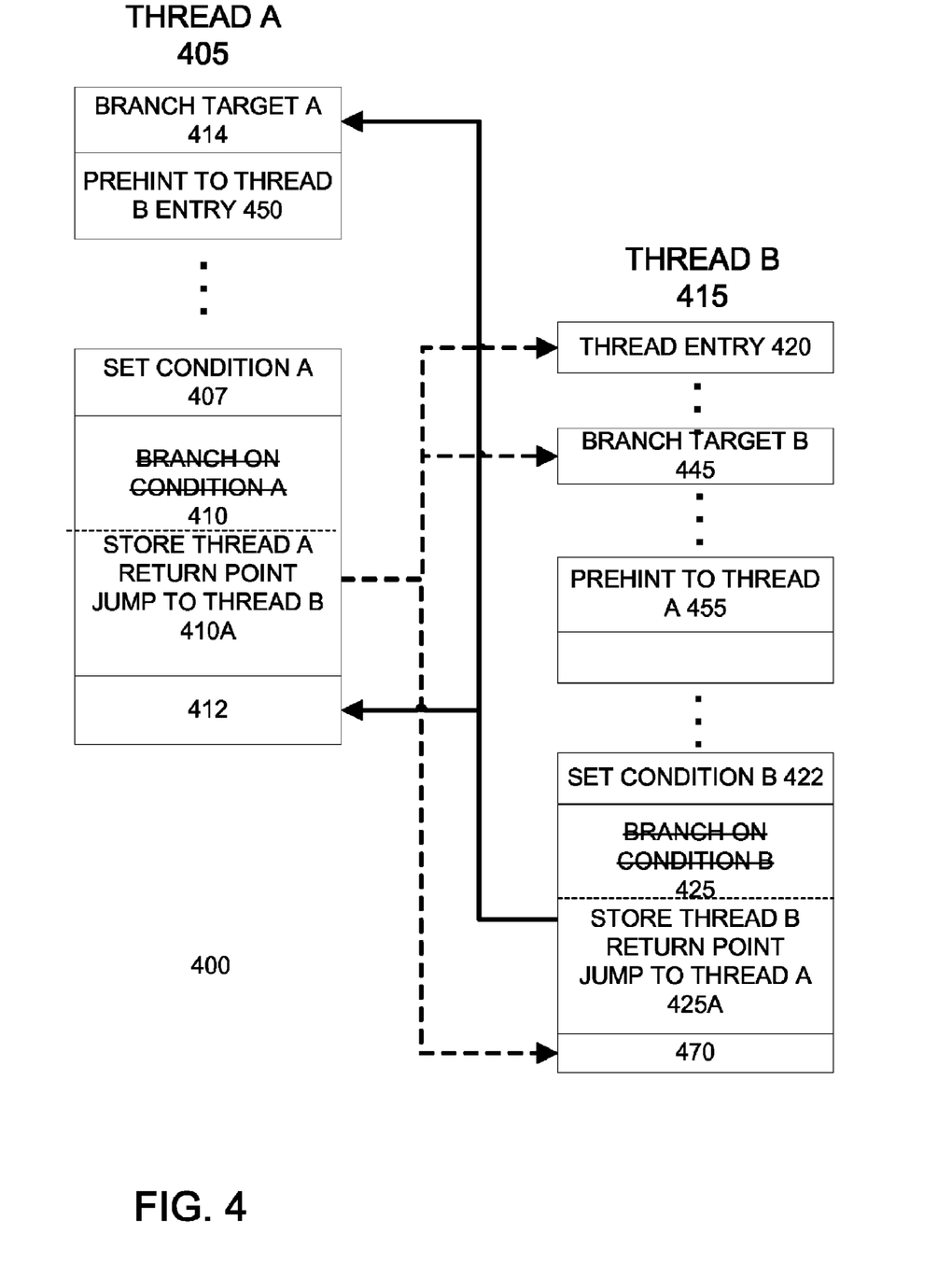
FIG. 4 illustrates another example of threads adapted to avoid pipeline stalls according to an embodiment of the invention.

FIG. 4 illustrates another example 400 of an application of an embodiment of the invention. In example 400, two threads both include conditional branch instructions that may potentially cause pipeline stalls. Thread A 405 includes a conditional branch instruction 410 responsive to a condition set by instruction 407. Because the value of this condition is set within the branch lead time, conditional branch instruction 410 may cause a pipeline stall.

To prevent this, an embodiment of the invention modifies thread A 405 to replace conditional branch instruction 410 with one or more thread switching instructions 410a. Thread switching instructions 410a direct a microprocessor to begin executing thread B 415 starting at thread entry point 420. A prehint instruction 450 is also added to thread A 405 to prevent a pipeline stall when switching to the target thread, which is this example is thread B 415.

The thread switching instructions 410a also ensure that thread A 405 is resumed at the correct location. In an embodiment, thread switching instructions evaluate the condition A set by instruction 407 and store the appropriate thread return location in a register, a stack, or other memory. For example, a select instruction can evaluate condition A and store one of two possible values in a register based on the results of condition A. In this example, the two possible values can be set to either of the possible target locations of the conditional branch instruction 410: location 412 or location 414.

In an alternate embodiment, thread B 415 may be modified so that execution of thread A can be resumed at a later time in the appropriate place, depending upon the value of the condition set by instruction 407. These modifications to thread A 405 and thread B 415 are similar to those discussed in previous examples.

In this example 400, thread B 415 also includes a conditional branch instruction 425 capable of causing a pipeline stall. Conditional branch instruction 425 is responsive to the value of a condition B set by instruction 422. To prevent a pipeline stall in thread B 415 from conditional branch instruction 425, an embodiment of the invention replaces conditional branch instruction 425 with thread switching instructions 425a directed to a new target thread.

In this example 400, the thread switching instructions 425a direct the processor to resume execution of thread A 405. In an embodiment, thread switching instructions 425a direct the processor to resume execution of thread A 405 at the location previously specified by thread switching instructions 410a. For example, an embodiment configures thread switching instructions 425a to direct the processor to jump to the location specified by the register previously used by thread switching instructions 410a to store the branch target of conditional branch instruction 410. Similarly, an embodiment configures prehint instruction 455 to access this register to determine the jump location in advance, thereby avoiding a pipeline stall from thread switching instructions 425a.

Additionally, because thread switching instructions 425a also replace conditional branch instruction 425, an embodiment of thread switching instructions 425a also ensure that thread B 415 is resumed at the correct location, similar to thread switching instructions 410a.

In this example, the execution of threads A 405 and B 415 operates as follows. The microprocessor initially executes thread A 405 up to the thread switching instructions 410a. In response to the thread switching instructions 410a, the microprocessor stops executing thread A 405 and begins to execute thread B 415 starting at thread entry point 420. Additionally, thread switching instructions 410a store the location to resume thread A 405, either location 412 or 414, in a first register in accordance with the value of condition A set in instruction 407. To prevent a pipeline stall from thread switching instructions 410a, prehint instruction 450 specifies the location to begin executing thread B 415 in advance. In an embodiment, prehint instruction 450 determines this location from data stored in a second register, which is initialized to the location of thread entry point 220.

The microprocessor executes thread B 415 up to thread switching instructions 425a. Thread switching instructions 425a direct the microprocessor to resume execution of thread A 405 at the location previously stored in the first register by thread switching instructions 410a. Additionally, thread switching instructions 425a store the location to resume thread B 415, either location 445 or 470, in the second register in accordance with the value of condition B set in instruction 422. To prevent a pipeline stall from thread switching instructions 425a, prehint instruction 455 specifies the location to resume executing thread A 405 in advance. In an embodiment, prehint instruction 455 determines this location from data previously stored in the first register by thread switching instructions 410a.

Thus, following the initial iteration of thread B 415 up to thread switching instructions 425a, the processor resumes execution of thread A 405 at either location 412 or 414, as determined previously by thread switching instructions 410a. If thread A 405 resumes execution at location 414, the thread will be executed until it reaches thread switching instructions 410a again. Once again, thread switching instructions 410a will determine the appropriate location to resume thread A 405 and then direct the processor to resume execution of thread B 415 at the location previously specified by thread switching instructions 425a. If thread A 405 resumes execution at location 412, additional prehint and thread switching instructions, similar to instructions 450 and 410a, are added at the end or any other location, such as another conditional branch instruction, of thread A 405 to direct the processor to resume execution of thread B 415 at the location previously specified by thread switching instructions 425a. These additional instructions and their counterparts in thread B 415 have been omitted for clarity from example 400.

This example of thread execution can continue for as many additional iterations as required. The execution of threads A 405 and B 415 continues in a similar manner as long as necessary. Each iteration of a thread switching instruction in thread A 405 determines and stores the appropriate thread resumption location in thread A 405 and then jumps to thread B 415 at the location previously stored by thread B's 415 thread switching instruction. Similarly, each iteration of a thread switching instruction in thread B 415 determines and stores the appropriate thread resumption location in thread B 415 and then jumps to thread A 405 at the location previously stored by thread A's 405 own thread switching instruction.

Further example thread executions can switch between more than two threads and/or between threads with multiple conditional branch instructions or other instructions potentially causing pipeline stalls. This example 400 can easily be extended to three or more threads by adding similarly configured thread switching and prehint instructions to each thread.

As discussed above, although omitted for clarity, additional similar thread switching and prehint instructions can be added at the end of each thread to ensure that when a thread terminates, any other suspended threads are resumed.

Figure 5:
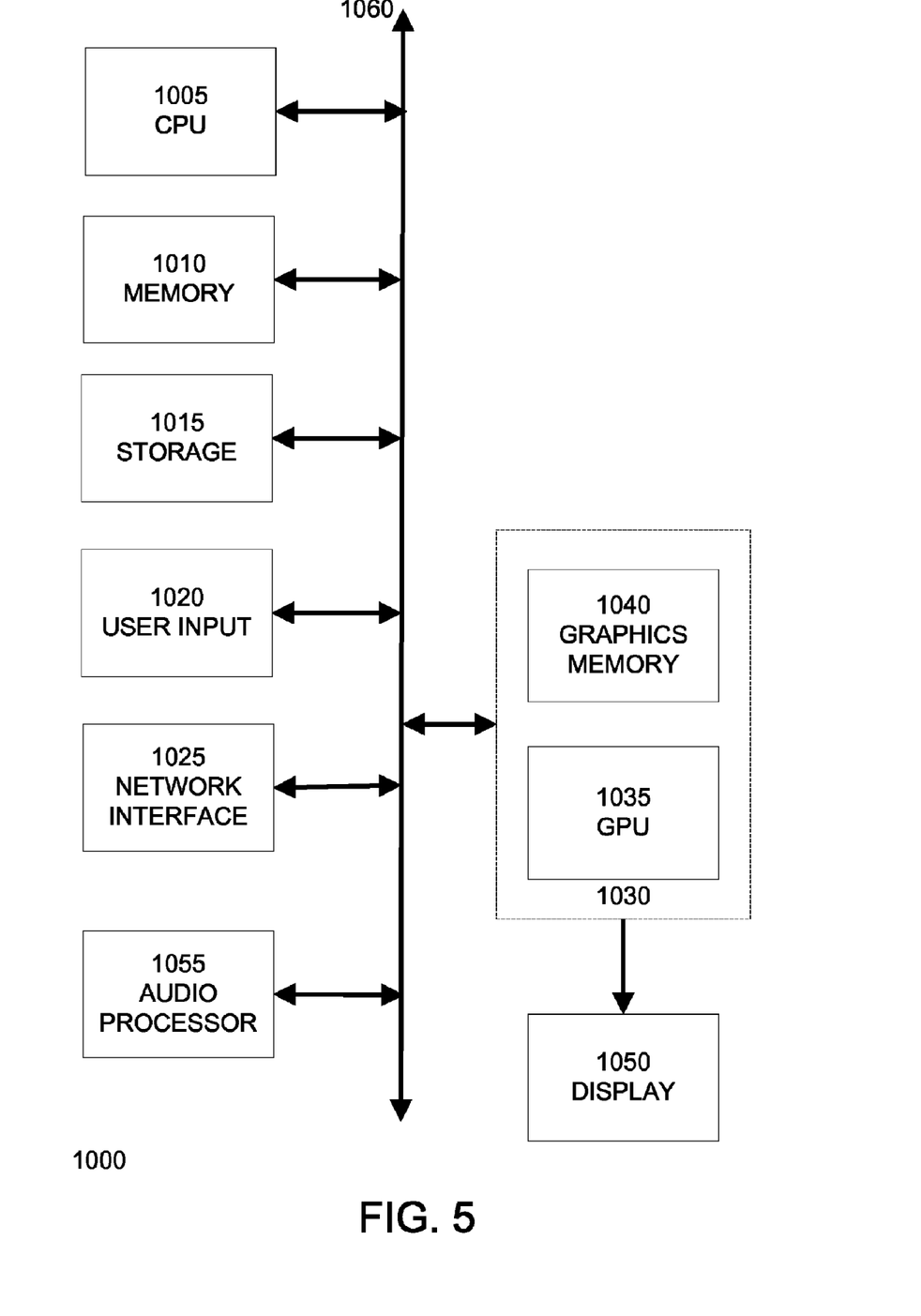
FIG. 5 illustrates an example hardware system suitable for implementing an embodiment of the invention.

FIG. 5 illustrates an example hardware system suitable for implementing an embodiment of the invention. FIG. 5 is a block diagram of a computer system 1000, such as a personal computer, video game console, personal digital assistant, or other digital device, suitable for practicing an embodiment of the invention. Computer system 1000 includes a central processing unit (CPU) 1005 for running software applications and optionally an operating system. CPU 1005 may be comprised of one or more processing cores. Memory 1010 stores applications and data for use by the CPU 1005. Storage 1015 provides non-volatile storage for applications and data and may include fixed disk drives, removable disk drives, flash memory devices, and CD-ROM, DVD-ROM, Blu-ray, HD-DVD, or other optical storage devices. User input devices 1020 communicate user inputs from one or more users to the computer system 1000, examples of which may include keyboards, mice, joysticks, touch pads, touch screens, still or video cameras, and/or microphones. Network interface 1025 allows computer system 1000 to communicate with other computer systems via an electronic communications network, and may include wired or wireless communication over local area networks and wide area networks such as the Internet. An audio processor 1055 is adapted to generate analog or digital audio output from instructions and/or data provided by the CPU 1005, memory 1010, and/or storage 1015. The components of computer system 1000, including CPU 1005, memory 1010, data storage 1015, user input devices 1020, network interface 1025, and audio processor 1055 are connected via one or more data buses 1060.

A graphics subsystem 1030 is further connected with data bus 1060 and the components of the computer system 1000. The graphics subsystem 1030 includes a graphics processing unit (GPU) 1035 and graphics memory 1040. Graphics memory 1040 includes a display memory (e.g., a frame buffer) used for storing pixel data for each pixel of an output image. Graphics memory 1040 can be integrated in the same device as GPU 1035, connected as a separate device with GPU 1035, and/or implemented within memory 1010. Pixel data can be provided to graphics memory 1040 directly from the CPU 1005. Alternatively, CPU 1005 provides the GPU 1035 with data and/or instructions defining the desired output images, from which the GPU 1035 generates the pixel data of one or more output images. The data and/or instructions defining the desired output images can be stored in memory 1010 and/or graphics memory 1040. In an embodiment, the GPU 1035 includes 3D rendering capabilities for generating pixel data for output images from instructions and data defining the geometry, lighting, shading, texturing, motion, and/or camera parameters for a scene. The GPU 1035 can further include one or more programmable execution units capable of executing shader programs.

The graphics subsystem 1030 periodically outputs pixel data for an image from graphics memory 1040 to be displayed on display device 1050. Display device 1050 is any device capable of displaying visual information in response to a signal from the computer system 1000, including CRT, LCD, plasma, and OLED displays. Computer system 1000 can provide the display device 1050 with an analog or digital signal.

Figure 6:
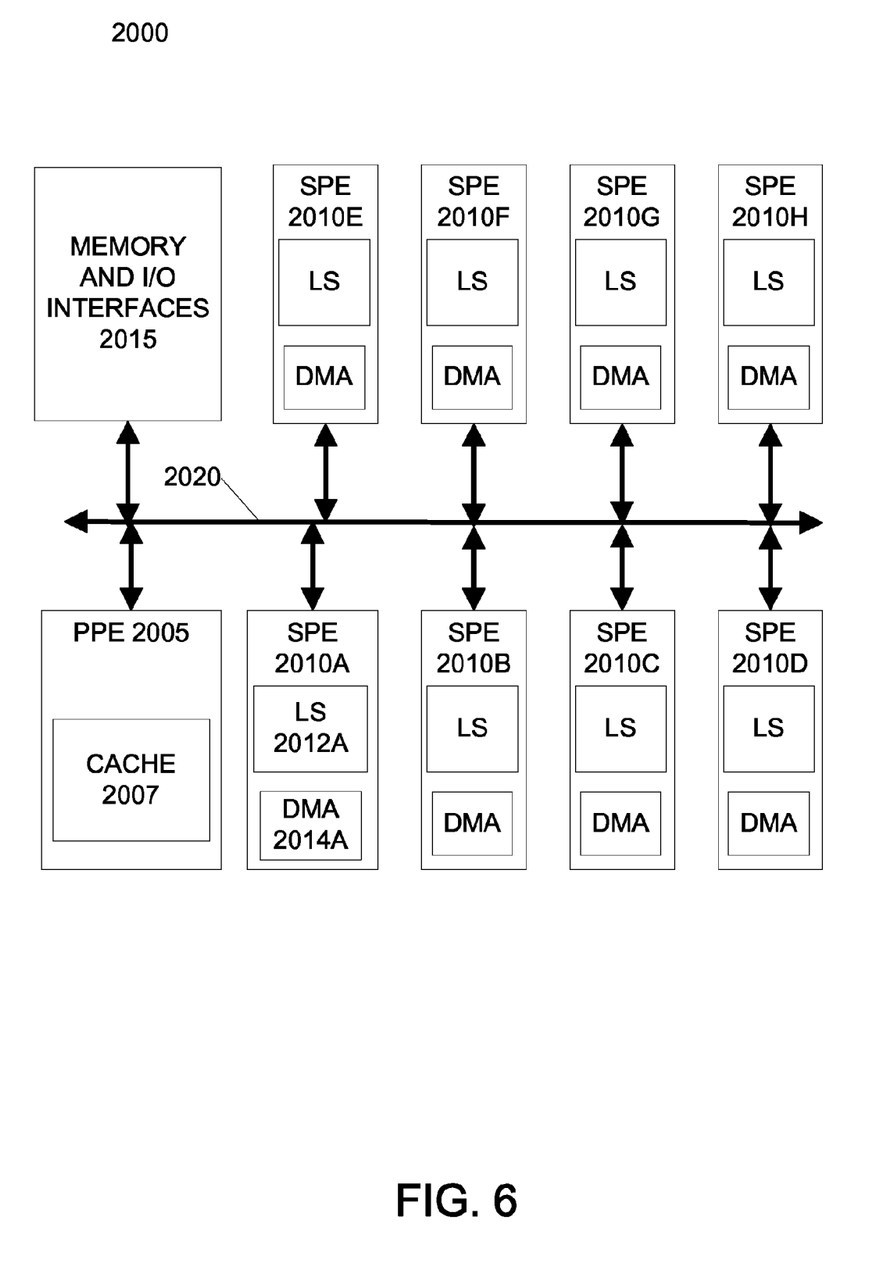
FIG. 6 illustrates an example processor suitable for implementing an embodiment of the invention.

In embodiments of the invention, CPU 1005 is one or more general-purpose microprocessors having one or more processing cores. Further embodiments of the invention can be implemented using one or more CPUs with microprocessor architectures specifically adapted for highly parallel and computationally intensive applications, such as media and interactive entertainment applications. FIG. 6 illustrates an example processor 2000 suitable for implementing an embodiment of the invention.

Processor 2000 includes a number of processor elements, each capable of executing independent programs in parallel. Processor 2000 includes PPE processor element 2005. PPE processor element is a general-purpose processor of CISC, RISC, or other type of microprocessor architecture known in the art. In one example, PPE processor element 2005 is a 64-bit, multithreaded RISC architecture microprocessor, such as the PowerPC architecture. PPE processor element 2005 can include a cache memory 2007 partitioned into one, two, or more levels of caches temporarily holding data and instructions to be executed by PPE processor element 2005.

For additional performance, processor 2000 includes a number of SPE processor elements 2010. In this example, processor 2000 includes eight SPE processor elements 2010A-2010H; however, other example processors can include different number of SPE processor elements. SPE processor elements 2010 are adapted for stream processing of data. In stream processing, a program is executed repeatedly on each item in a large set of data. To facilitate stream processing, the SPE processor elements 2010 may include instruction execution units capable of executing SIMD instructions on multiple data operands simultaneously. SPE processor elements 2010 may also include instruction units capable of executing single-instruction, single data (SISD) for more general processing tasks.

Each SPE processor element, such as SPE processor element 2010A, includes local data and instruction storage 2012A. Data and instructions can be transferred to and from the local data and instruction storage 2012A via DMA unit 2014A. The DMA units, such as unit 2014A, are capable of transferring data to and from each of the SPE processor elements 2010 without processor supervision, enabling the SPE processor elements 2010 to process data continuously without stalling.

Data and instructions are input and output by the processor 2000 via memory and I/O interfaces 2015. Data and instructions can be communicated between the memory and I/O interfaces 2015, the PPE processor element 2005, and SPE processor elements 2010 via processor bus 2020.

Embodiments of the invention can be used to improve performance when executing any type of multithreaded applications on both general-purpose microprocessors and more specialized microprocessors such as processor 2000. Generally, embodiments of the invention can be used in conjunction with two or more threads executed by any type of processor or virtual machine capable of executing threads in a time-multiplexed manner. For example, embodiments of the invention can be used in conjunction with two or more threads executed by the PPE 2005 and/or any SPE 2010.

Additionally, embodiments of the invention can be utilized to improve the performance of multithreaded emulation and virtual machine applications. For example, embodiments of the invention can be used to emulate video game consoles such as the Playstation, Playstation 2, and PSP systems; x86-based computer and video game systems; PowerPC-based computer and video game systems; Java, .NET, and other virtual machine and runtime environments.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of optimizing a plurality of threads to be executed by a processor, the method comprising:
    identifying an instruction of a first thread as a high latency floating point instruction;
    determining if a pipeline stall is likely from the identified high latency floating point instruction; and
    in response to a determination that the pipeline stall is likely from the identified high latency floating point instruction, adding at least one thread switching instruction to the first thread, wherein the thread switching instruction is adapted to switch from the execution of the first thread to a second thread.

2. The method of claim 1, wherein adding the at least one thread switching instruction comprises:
    adding an instruction prehint to the first thread, wherein the instruction prehint is adapted to prevent a pipeline stall during the switch from the execution of the first thread to a second thread.

3. The method of claim 1, wherein adding the at least one thread switching instruction comprises:
    configuring the at least one thread switching instruction to direct execution to an entry point of the second thread.

4. The method of claim 3, wherein the entry point of the second thread is the beginning of the second thread.

5. The method of claim 3, wherein the entry point of the second thread is a branch target associated with a branch instruction of the second thread.

6. The method of claim 5, wherein the entry point of the second thread was previously stored by at least one thread switching instruction of the second thread.

7. The method of claim 3, wherein the entry point of the second thread is a first instruction of the second thread intended to be executed after a second instruction of the second thread, wherein the second instruction may potentially cause a pipeline stall in the second thread.

8. The method of claim 7, wherein the second instruction of the second thread is a high latency floating point instruction.

9. The method of claim 1, further comprising:
adding at least one thread switching instruction to the second thread, wherein the thread switching instruction of the second thread is adapted to switch from the execution of the second thread to the first thread.

10. The method of claim 9, wherein the thread switching instruction of the second thread is configured to direct execution to a thread resumption point of the first thread.

11. The method of claim 10, wherein the thread resumption point of the first thread is a first instruction of the first thread intended to be executed following the identified instruction of the first thread.

12. The method of claim 11, wherein adding at least one thread switching instruction to the second thread further comprises:
analyzing at least the identified instruction to determine the location of the first instruction of the first thread intended to be executed following the identified instruction; and
configuring the thread switching instruction of the second thread to direct execution to the location of the first instruction of the first thread.

13. The method of claim 12, wherein analyzing at least the identified instruction comprises determining a value of a condition, wherein the identified instruction is responsive to the value of the condition.

14. The method of claim 12, wherein analyzing at least the identified instruction comprises:
determining an address of the first instruction of the first thread intended to be executed following the identified instruction;
storing the address of the first instruction of the first thread intended to be executed following the identified instruction; and
configuring the at least one thread switching instruction of the second thread to access the stored address.

15. The method of claim 14, further comprising:
storing the address of the first instruction of the first thread intended to be executed following the identified instruction in a register.

16. The method of claim 1, wherein the thread switching instruction of the first thread includes an instruction to retrieve data associated with the second thread and previously stored.

17. The method of claim 9, wherein adding the thread switching instruction of the second thread comprises:
identifying a high latency floating point instruction of the second thread that may potentially cause a pipeline stall;
determining if a pipeline stall is likely from the identified high latency floating point instruction of the second thread; and
in response to a determination that the pipeline stall is likely from the identified instruction of the second thread, replacing the identified instruction of the second thread with the at least one thread switching instruction of the second thread.

18. The method of claim 1, further comprising:
selecting one of a plurality of threads according to a load balancing scheme; and
adding at least one thread switching instruction to the second thread, wherein the thread switching instruction of the second thread is adapted to switch from the execution of the second thread to the selected thread.

19. A non-volatile storage upon which is stored a program of machine readable program code executable by a processor, the program code having operations for:
identifying an instruction of a first thread as a high latency floating point instruction;
determining if a pipeline stall is likely from the identified high latency floating point instruction; and
in response to a determination that the pipeline stall is likely from the identified high latency floating point instruction, adding at least one thread switching instruction to the first thread, wherein the thread switching instruction is adapted to switch from the execution of the first thread to a second thread.

20. A computer system having optimized multithread processing, comprising:
a processor associated with a computer system, the processor configured to execute program code including:
program code to identify an instruction of a first thread as a high latency floating point instruction;
program code to determine if a pipeline stall is likely from the identified high latency floating point instruction; and
program code to, in response to a determination that the pipeline stall is likely from the identified high latency floating point instruction, add at least one thread switching instruction to the first thread, wherein the thread switching instruction is adapted to switch from the execution of the first thread to a second thread.

* * * * *